US012751430B2

(12) United States Patent
Hu

(10) Patent No.: US 12,751,430 B2
(45) Date of Patent: Oct. 6, 2026

(54) HUMMINGBIRD FEEDER

(71) Applicant: Shenzhen Junshuo Technology Co., Ltd., Shenzhen (CN)

(72) Inventor: Peng Hu, Shenzhen (CN)

(73) Assignee: Shenzhen Junshuo Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/361,111

(22) Filed: Oct. 17, 2025

(65) Prior Publication Data

US 2026/0107926 A1 Apr. 23, 2026

(30) Foreign Application Priority Data

Oct. 18, 2024 (CN) ........................ 202411460970.X

(51) Int. Cl.
*A01K 39/02* (2006.01)

(52) U.S. Cl.
CPC ................................ *A01K 39/0206* (2013.01)

(58) Field of Classification Search
CPC ..... A01K 39/0206; A01K 39/02; A01K 39/00
See application file for complete search history.

(56) References Cited

U.S. PATENT DOCUMENTS 9,351,479 B2 * 5/2016 Chen .................. A01K 39/0206
11,985,957 B1 * 5/2024 Li ...................... A01K 39/0113
12,336,513 B1 * 6/2025 Zhang .................... A01K 39/02
2012/0060762 A1 * 3/2012 Cowger ............. A01K 39/0206 119/72
2014/0109836 A1 * 4/2014 Gauker .............. A01K 39/0206 119/75
2014/0158056 A1 * 6/2014 Vaughn, Jr. ........ A01K 39/0206 119/72
2019/0320619 A1 * 10/2019 Haney ................ A01K 39/0206

OTHER PUBLICATIONS

"birdsnap® H53 Hummingbird Feeder with Camera 2K Live Stream 32GB Card Ant Moat Mounting Auto Notify AI Identify Birds Feeder Camera 2.4G WiFi Wireless Outdoors Birds Watching Gift for Bird Lover" as retrieved from the following Amazon link on Oct. 11, 2025. Date First Available: Feb. 20, 2025. The inventor(s) is directly responsible for this public disclosure. https://www.amazon.com/BIRDSNAP-Wireless-Outdoor-Hummingbird-Capacity/dp/B0CCK1D9NH?

* cited by examiner

*Primary Examiner* — Kristen C Hayes
(74) *Attorney, Agent, or Firm* — Nicholas Makridakis

(57) ABSTRACT

A hummingbird feeder includes an upper lid, reservoir, camera unit, base, and sealing lid. The upper lid is detachably connected to the reservoir, sealing rings are sleeved on the sealing lid, the sealing lid is detachably connected to the reservoir, outer walls of the sealing rings are connected to an inner wall of the reservoir, the upper lid is sleeved in the sealing lid and detachably connected to the reservoir, and after the upper lid is connected to the reservoir, a pressure of the upper lid on the sealing lid is not zero. Compared with the prior art, the present disclosure allows the pressure of the upper lid on the sealing lid to enable the sealing lid to press the reservoir tightly, ensuring full contact between the sealing rings and the reservoir, and effectively improving the sealing performance.

10 Claims, 12 Drawing Sheets

HUMMINGBIRD FEEDER

TECHNICAL FIELD

The present disclosure relates to the field of bird feeding devices and observation devices, and in particular, to a hummingbird feeder.

BACKGROUND

Hummingbird feeders are relatively common devices in North America, typically placed in gardens. The hummingbird feeders are different from standard bird feeders, because hummingbirds consume liquid nectar or artificial nectar, whereas most other birds feed on dry solid food. The artificial nectar is typically composed of water sweetened with sugar or honey. In many hummingbird feeders, the nectar (or the artificial nectar) is stored in a reservoir and transported to an artificial blossom. A perch may be provided on the hummingbird feeder, allowing hummingbirds to alight. Subsequently, the hummingbird, owing to its elongated beak, inserts the beak into an access port of the artificial blossom to feed.

The patent CN118104583A discloses a hummingbird feeder. The hummingbird feeder is equipped with a camera device and an AI identification mechanism to automatically identify and record hummingbirds, and is a relatively common hummingbird feeder currently on the market. A prevalent issue with currently available hummingbird feeders is inadequate sealing, which often leads to liquid seepage or leakage from various parts of the feeder. This results in both a waste of nectar and considerable inconvenience during use.

SUMMARY

The technical problem to be solved by the present disclosure is to provide a hummingbird feeder with good sealing performance, overcoming the defect of inadequate sealing of hummingbird feeders in the prior art, which leads to liquid leakage from various parts.

The present disclosure provides a hummingbird feeder, including an upper lid, a reservoir, a camera unit, and a base, and further including a sealing lid, where the upper lid is detachably connected to the reservoir, sealing rings are sleeved on the sealing lid, the sealing lid is detachably connected to the reservoir, outer walls of the sealing rings are connected to an inner wall of the reservoir, the upper lid is sleeved in the sealing lid and detachably connected to the reservoir, and after the upper lid is connected to the reservoir, a pressure of the upper lid on the sealing lid is not zero.

Preferably, sealing ring grooves are provided on the sealing lid, the sealing rings are sleeved on the sealing ring grooves, and there are three sealing rings.

Preferably, the upper lid includes a first fastening structure, the reservoir includes a second fastening structure, and the first fastening structure and the second fastening structure cooperate with each other to snap-fit the upper lid and the reservoir.

Preferably, the first fastening structure includes one or more polygonal mounting members, the second fastening structure includes an upper engagement portion and a lower engagement portion, a mounting groove is formed between the upper engagement portion and the lower engagement portion, and the first fastening structure is inserted in the mounting groove for mounting.

Preferably, the first fastening structure includes an insertion end, an upper snap-fit portion, and a lower snap-fit portion; the insertion end, the upper snap-fit portion, and the lower snap-fit portion are integrally formed, a cross-sectional length of the insertion end in an axial direction of the hummingbird feeder is smaller than a width of the mounting groove, and a distance from an upper end of the upper snap-fit portion to a lower end of the lower snap-fit portion is adapted to a width of the mounting groove.

Preferably, a spacing is reserved between the upper snap-fit portion and the lower snap-fit portion.

Preferably, the camera unit includes a camera device, an accommodating mechanism, a snap-fit mechanism, finger flanges, a rotating shaft, and a wire channel; the camera device is mounted in the accommodating mechanism, the accommodating mechanism is movably connected to the snap-fit mechanism by means of the rotating shaft, the snap-fit mechanism is detachably mounted on the reservoir, there are two finger flanges, and the two finger flanges are respectively arranged on two sides of the snap-fit mechanism and form a triangle together with a connecting line of the wire channel.

Preferably, the hummingbird feeder further includes a feeding port, a blossom-shaped feeder, and a perch; the perch includes a perch mounting hole; a lower end of the blossom-shaped feeder penetrates the perch mounting hole and then is inserted into the feeding port; the perch further includes a perching portion and a perch connecting portion; and the perching portion is connected to the perch mounting hole by means of the perch connecting portion.

Preferably, the base is detachably connected to the reservoir, the sealing rings are sleeved on the reservoir, the outer walls of the sealing rings are connected to an inner wall of the base, and after the reservoir is connected to the base, the reservoir generates a gravity-independent pressure on the base.

Preferably, the hummingbird feeder further includes a bracket, the bracket includes a transverse bracket body and a vertical bracket body, the transverse bracket body is perpendicular to the vertical bracket body, a third ant-proof unit and a bracket through hole are provided on the transverse bracket body, the third ant-proof unit is arranged around the bracket through hole, the bracket through hole communicates an upper end and a lower end of the transverse bracket body, a protective plug is mounted in the bracket through hole, and an electric wire through hole for the protective plug to penetrate is provided on the protective plug.

Compared with the prior art, in the present disclosure, by means of the design of the upper lid, the sealing lid and the reservoir, the pressure of the upper lid on the sealing lid enables the sealing lid to press the reservoir tightly, ensuring full contact between the sealing rings and the reservoir, and effectively improving the sealing performance. The first fastening structure and the second fastening structure cooperate to snap-fit the upper lid and the reservoir. The structural design of the first fastening structure and the second fastening structure achieves a smoother snap-fit process and more stable snap-fitting, prolongs the service life of the two, and makes the two not easily damaged. By means of the design of detachable connection between the base and the reservoir, the pressure of the reservoir on the base generates a gravity-independent pressure, ensuring full contact between the sealing rings and the base, and further improving the sealing performance.

BRIEF DESCRIPTION OF THE DRAWINGS

The present disclosure is described in further detail below with reference to the accompanying drawings and embodiments, as shown in the drawings:

Reference Numerals: 1—Hummingbird feeder; 11—Hook; 12—Upper lid; 13—Sealing lid; 14—Reservoir; 15—Camera unit; 16—Base cover plate; 17—Base; 18—Connector; 19—Bracket; 10—Sealing ring;

121—First ant-proof unit; 122—First fastening structure; 1221—Insertion end; 1222—Upper snap-fit port; 1223—Limiting member; 1224—Lower snap-fit portion; 123—Canopy; 131—Sealing ring groove; 141—Second fastening structure; 1411—Upper engagement portion; 1412—Lower engagement portion; 1413—Mounting groove; 142—Reservoir cavity; 143—Third fastening structure; 1431—Base upper engagement portion; 1432—Base lower engagement portion; 1433—Base mounting groove; 144—Reservoir buckle; 145—Reservoir sealing ring groove; 146—Mounting space; 151—Camera device; 152—Accommodating mechanism; 153—Snap-fit mechanism; 154—Finger flange; 155—Rotating shaft; 156—Wire channel; 157—Wire fixing device; 161—Feeding port; 162—Perch; 1621—Perch mounting hole; 1622—Perching portion; 1623—Perch connecting portion; 163—Blossom-shaped feeder; 171—Fourth fastening structure; 1711—Base insertion end; 1712—Base upper snap-fit portion; 1714—Base lower snap-fit portion; 173—Base reservoir; 174—Base liquid outlet; 176—Base sealing member; 177—Base external groove; 181—Second ant-proof unit; 182—Connector snap-fit mechanism; 191—Bracket external groove; 192—Bracket snap-fit mechanism; 193—Universal mounting hole; 194—Third ant-proof unit; 195—Protective plug; 1951—Electric wire through hole; 196—Bracket through hole; 197—Vertical mounting hole; 198—Transverse bracket body; and 199—Vertical bracket body.

Figure 1:
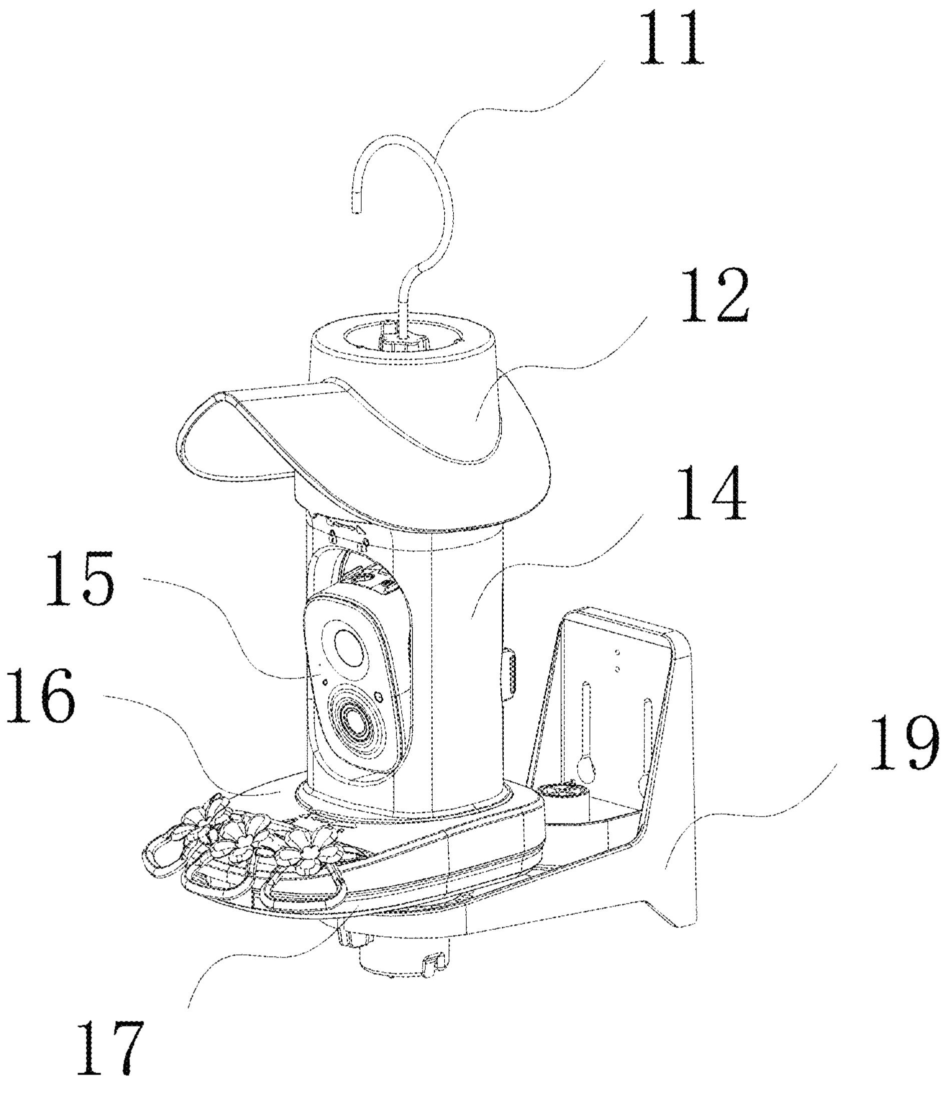
Figure 2:
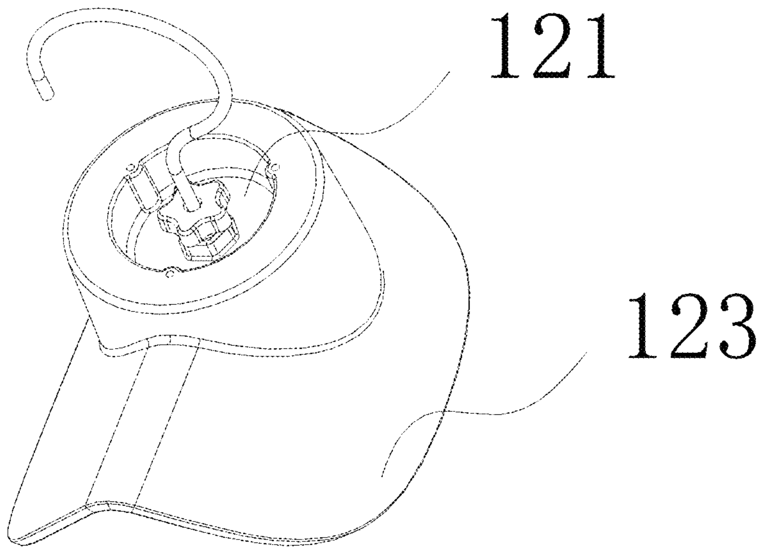
Figure 3:
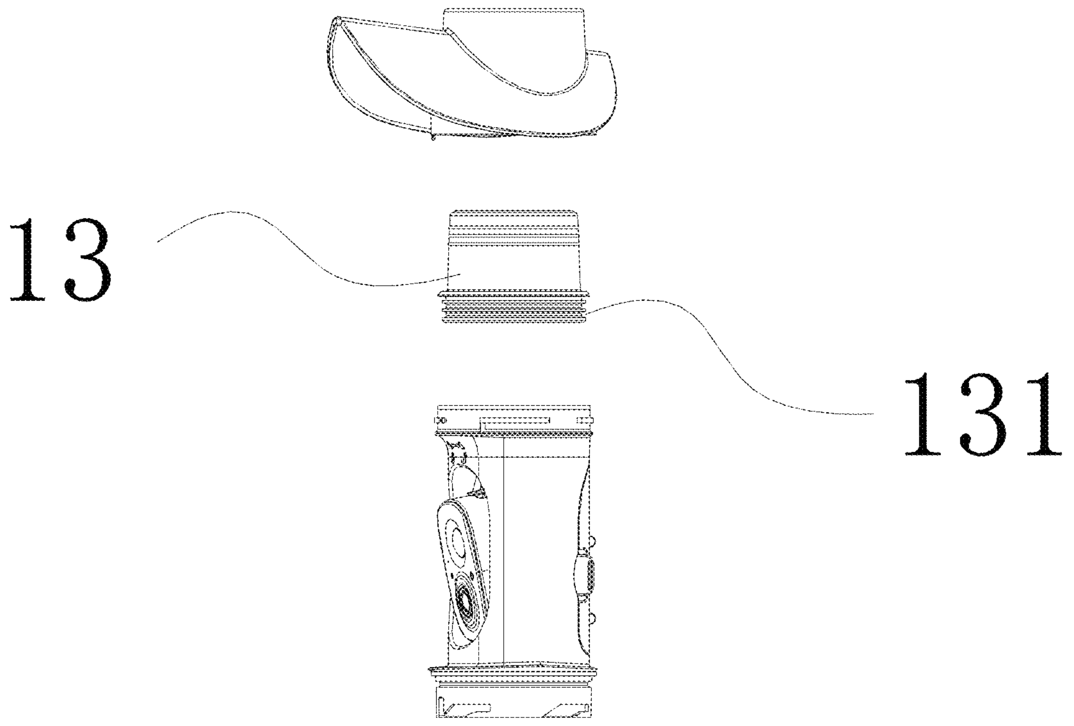
Figure 4:
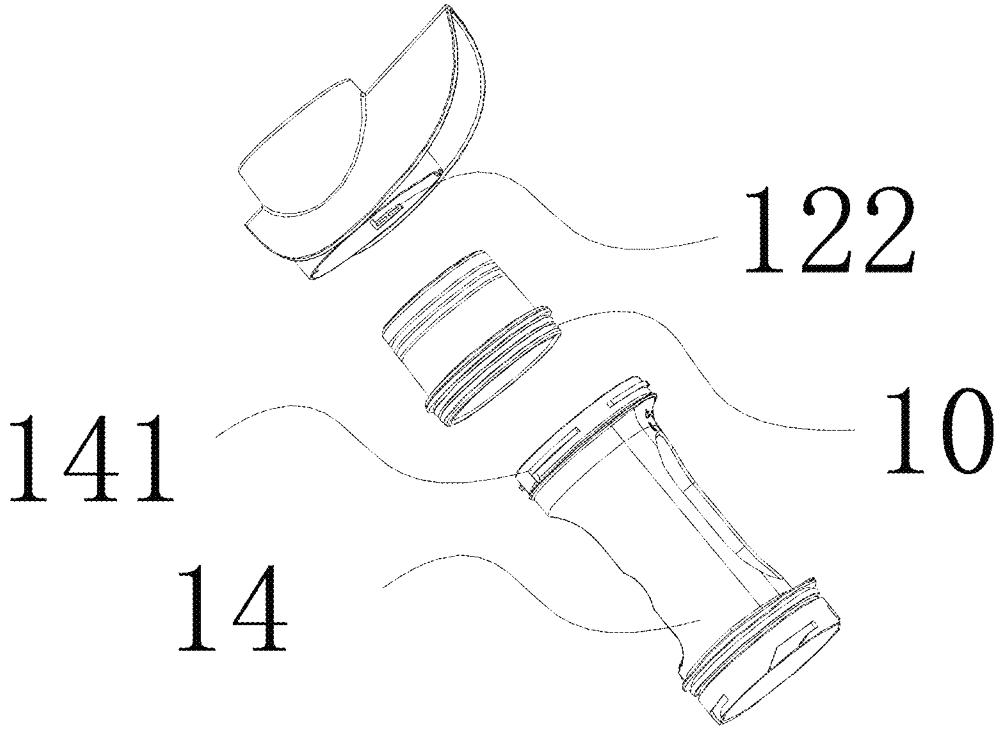
Figure 5:
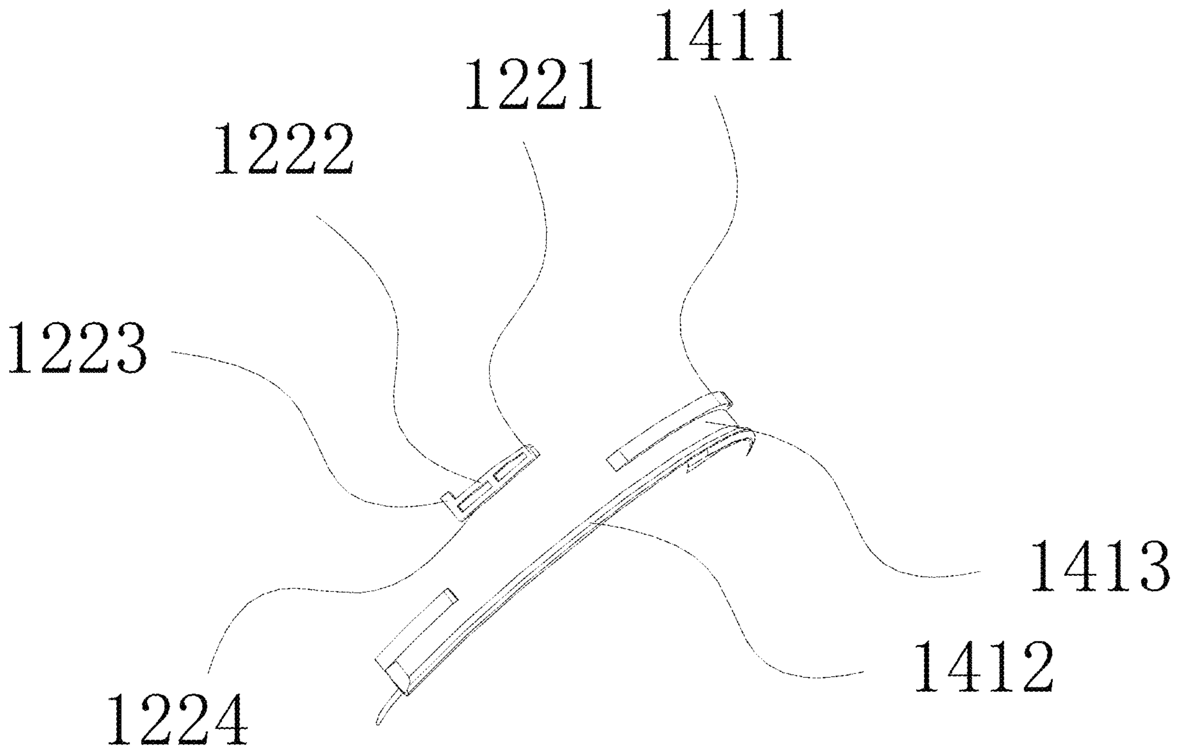
Figure 6:
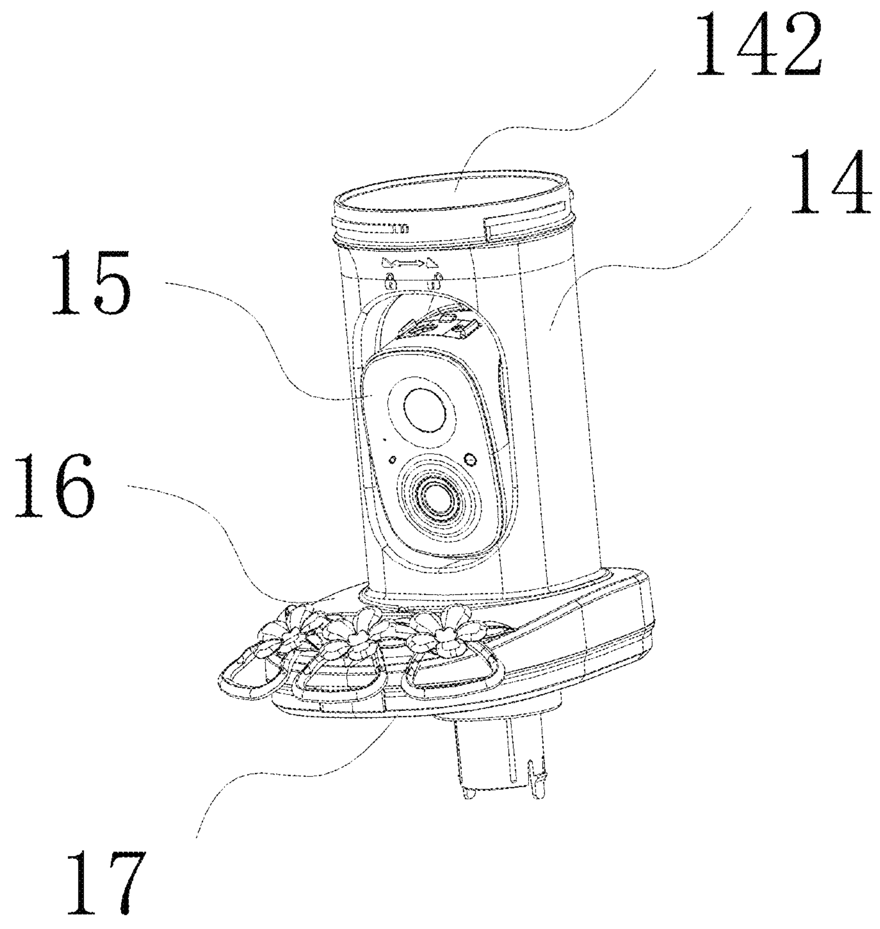
Figure 7:
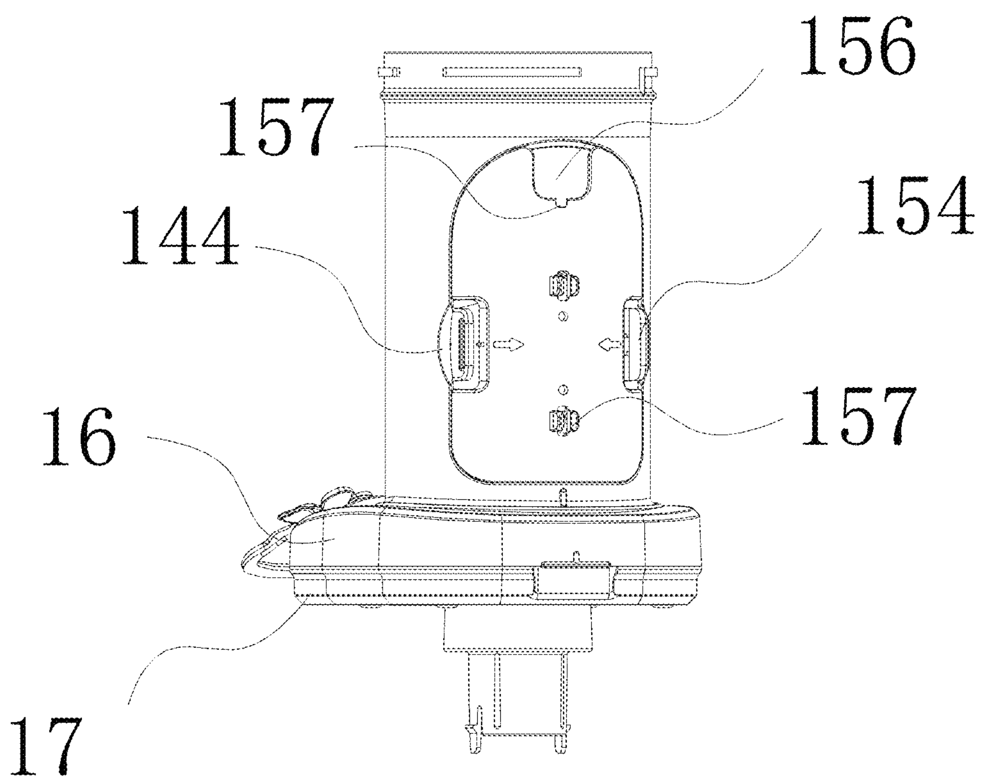
Figure 8:
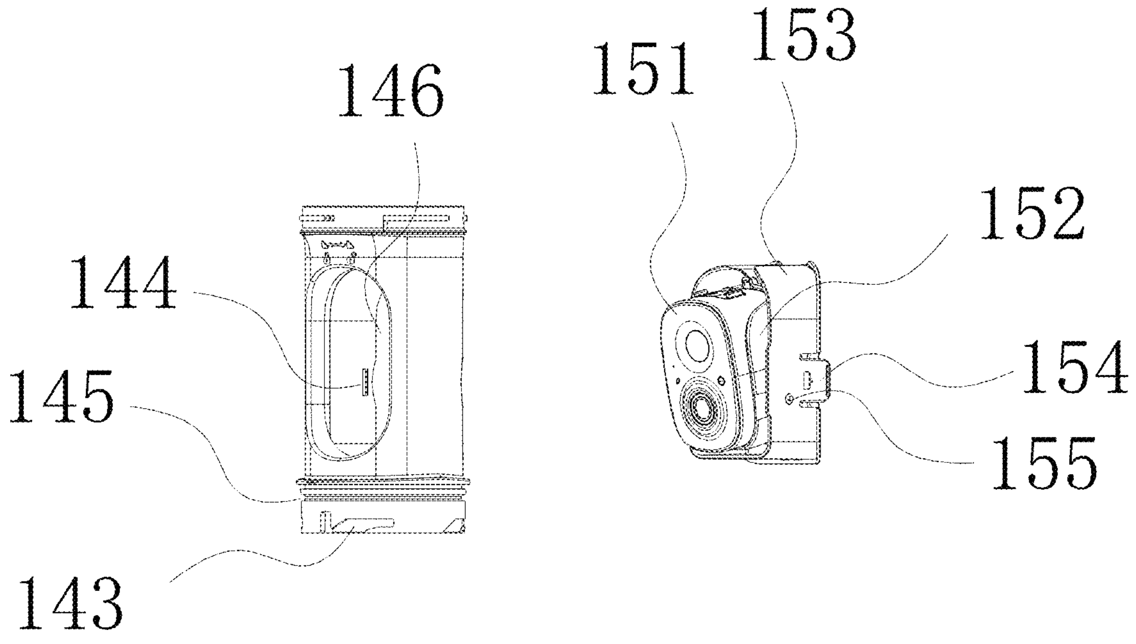
Figure 9:
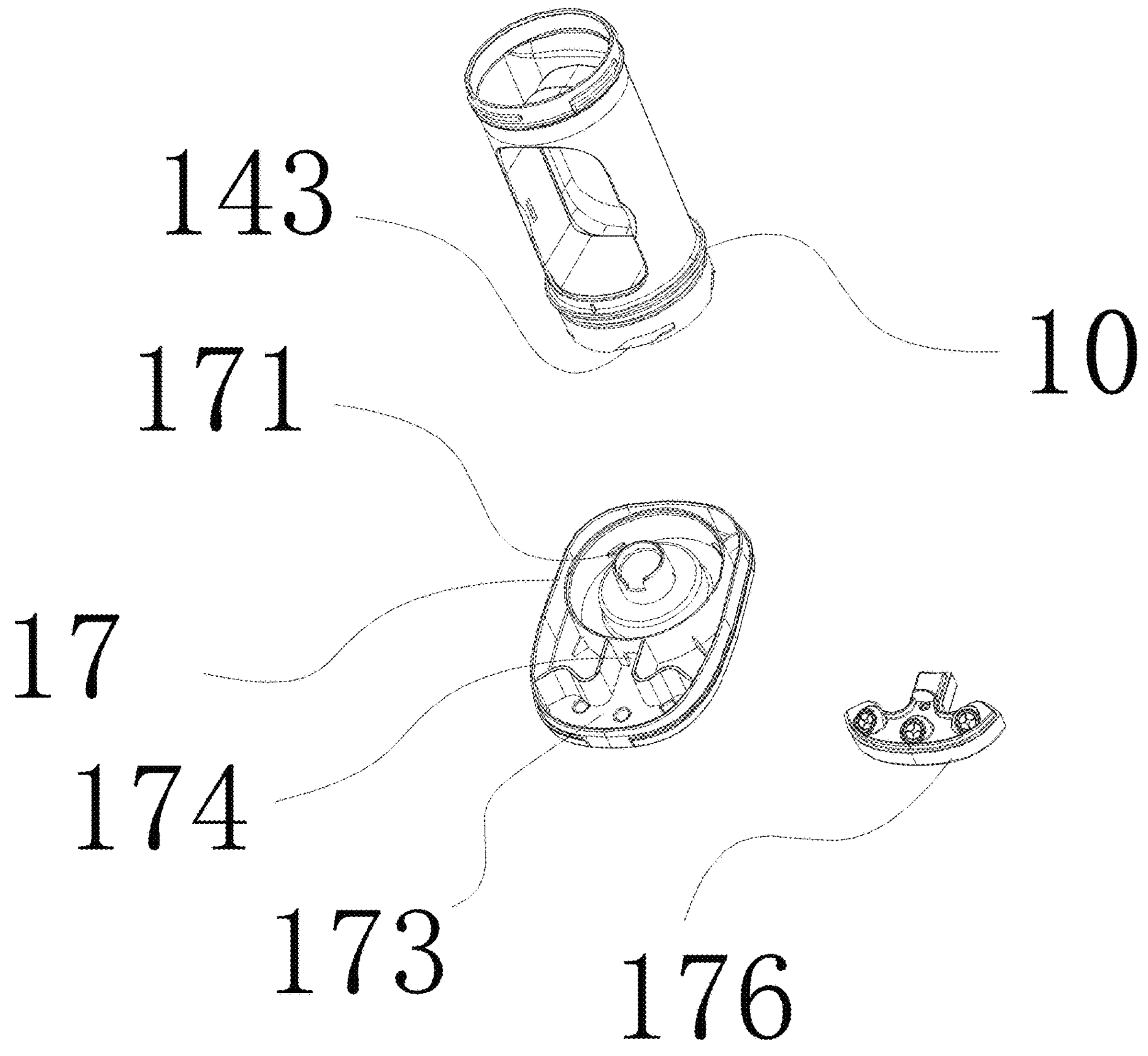
Figure 10:
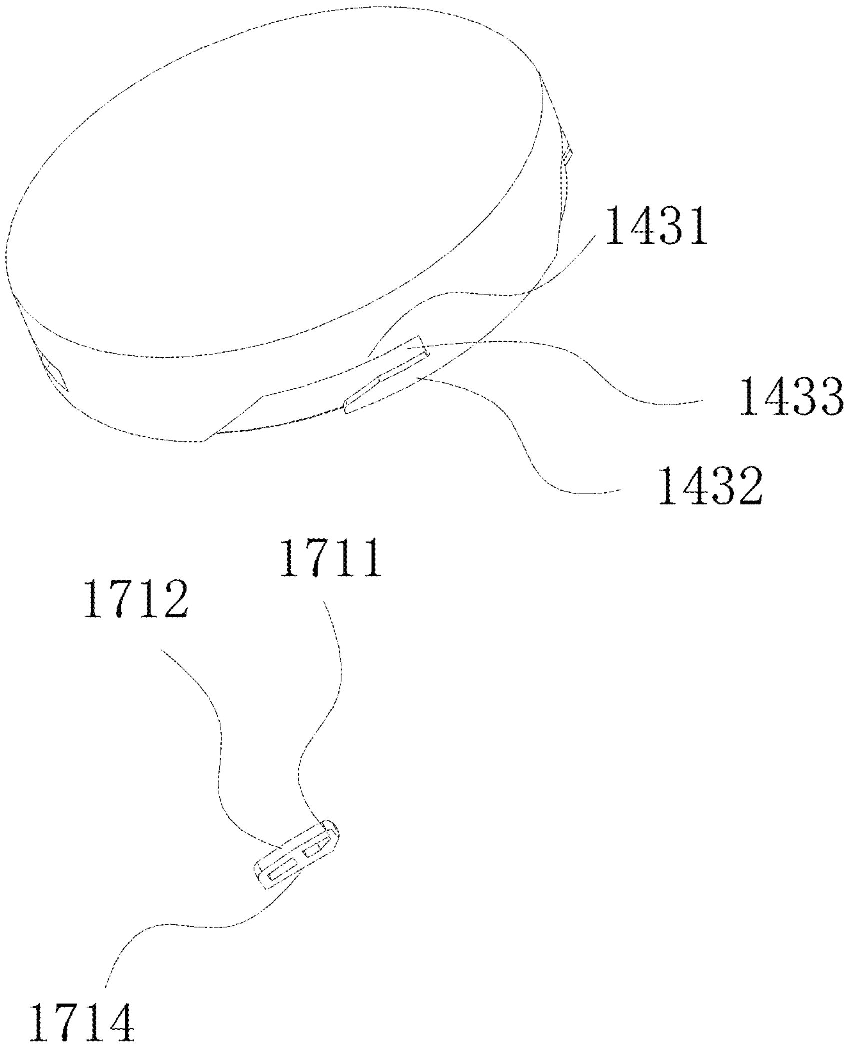
Figure 11:
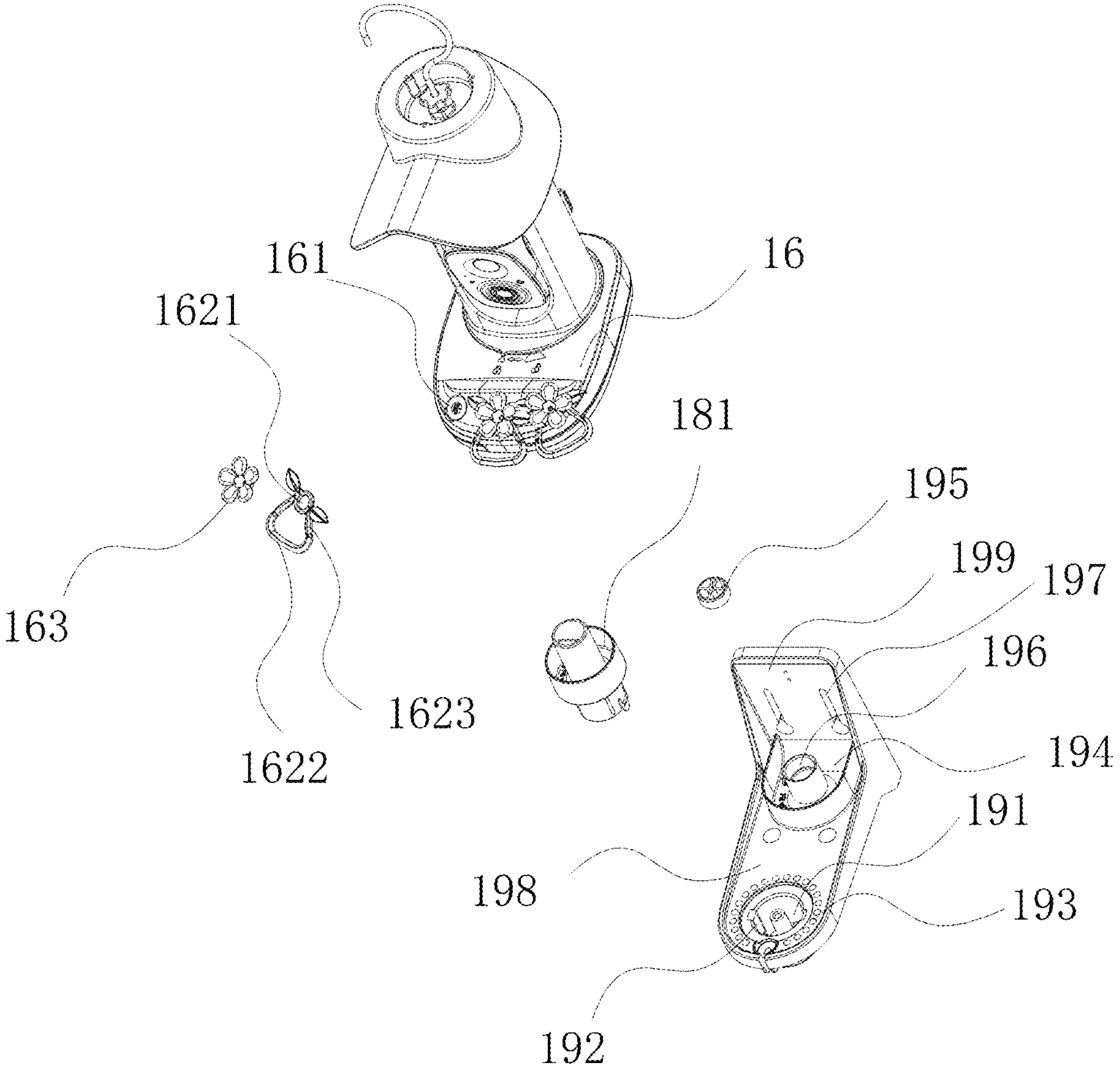
Figure 12:
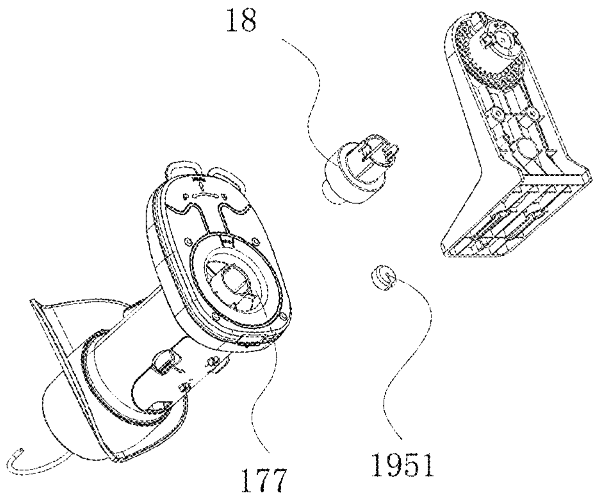

FIG. 1 is a schematic structural diagram of a hummingbird feeder according to the present disclosure;

FIG. 2 is a schematic structural diagram of an upper lid of a hummingbird feeder according to the present disclosure;

FIG. 3 is a first exploded view of an upper-layer structure of a hummingbird feeder according to the present disclosure;

FIG. 4 is a second exploded view of an upper-layer structure of a hummingbird feeder according to the present disclosure;

FIG. 5 is a schematic diagram of a first fastening structure and a second fastening structure of a hummingbird feeder according to the present disclosure;

FIG. 6 is a schematic diagram 1 of a lower structure of a hummingbird feeder according to the present disclosure;

FIG. 7 is a schematic diagram 2 of a lower structure of a hummingbird feeder according to the present disclosure;

FIG. 8 is a schematic diagram of disassembly of a camera unit of a hummingbird feeder according to the present disclosure;

FIG. 9 is a schematic diagram of a bottom structure of a hummingbird feeder according to the present disclosure;

FIG. 10 is a schematic diagram of a third fastening structure and a fourth fastening structure of a hummingbird feeder according to the present disclosure;

FIG. 11 is a first exploded view of a bottom structure of a hummingbird feeder according to the present disclosure; and FIG. 12 is a second exploded view of a bottom structure of a hummingbird feeder according to the present disclosure.

DETAILED DESCRIPTION OF THE EMBODIMENTS

To overcome the defect of inadequate sealing of hummingbird feeders in the prior art, which leads to liquid leakage from various parts, a hummingbird feeder with good sealing performance is provided.

To facilitate the understanding of the present disclosure, the present disclosure is described more completely below with reference to the accompanying drawings. Typical embodiments of the present disclosure are shown in the accompanying drawings. However, the present disclosure is embodied in various forms without being limited to the embodiments set forth herein. Rather, these embodiments are provided so that the disclosure of the present disclosure will be understood more thoroughly and comprehensively.

It should be noted that, when a component is fixed to another component, the component may be fixed to the other component directly or via an intermediate component. When a component is connected to another component, the component may be connected to the another component directly or via an intermediate component. The terms “vertical”, “horizontal” and similar expressions used herein are for illustrative purposes only.

Unless otherwise defined, all technical and scientific terms used herein have the same meanings as commonly understood by those skilled in the technical field of the present disclosure. The terms used in the specification of the present disclosure herein are only for the purpose of describing specific embodiments, and are not intended to limit the present disclosure.

The terms “first”, “second”, etc. used in the specification may be used to describe various constituent elements, but these constituent elements are not restricted by these terms. The purpose of using these terms is solely to distinguish one constituent element from another. For instance, without departing from the protection scope of this invention, the first constituent element may be referred to as the second constituent element, and similarly, the second constituent element may also be referred to as the first constituent element. The term “and/or” used herein includes any and all combinations of one or more related items listed.

Please refer to FIG. 1, the hummingbird feeder 1 of the present disclosure includes a hook 11, an upper lid 12, a reservoir 14, a camera unit 15, a base cover plate 16, a base 17, and a bracket 19. The hook 11 is mounted on the upper lid 12, the upper lid 12 is detachably connected to the reservoir 14, the base 17 is detachably connected below the reservoir 14, the base cover plate 16 detachably covers an upper end of the base 17, and the bracket 19 is detachably connected below the base 17. The camera unit 15 detachably penetrates the reservoir 14.

Please refer to FIG. 2, a first ant-proof unit 121 is provided at an upper end of the upper lid 12, and the first ant-proof unit 121 is a communicated groove and is generally ring-shaped. During use, a liquid such as water or an insect repellent can be stored in the groove. When climbing onto the upper lid 12 along with the hook 11, an insect such as an ant can be blocked, by the liquid stored in the first ant-proof unit 121, from climbing onto the base cover plate 16 to suck a stored liquid such as nectar. A canopy 123 is further provided on the upper lid 12, and the canopy 123 can reduce the impact of rainwater on the camera unit 15, prevent a camera lens from being polluted by water stains, and prevent the rainwater from wetting the camera unit 15 to cause damage to the camera unit 15.

Please refer to FIG. 3 to FIG. 5, a plurality of sealing ring grooves 131 are provided on the sealing lid 13, and sealing rings 10 can be sleeved on the sealing ring grooves 131. In this embodiment, there are three sealing ring grooves 131, and three sealing rings 10 are correspondingly sleeved thereon. In the hummingbird feeder 1, since the top end is not immersed in the liquid, the sealing performance of the top end is more stringently required than that of the bottom end. When there are three sealing ring grooves 131, good sealing performance can be achieved at the top end of the hummingbird feeder 1, thereby preventing the sealing rings 10 from being damaged or loosely mounted, which may cause poor sealing performance.

In the prior art, there is generally one sealing ring. When the sealing lid is closed with the reservoir, the sealing ring cooperates with the inner wall of the reservoir to achieve a certain upper-layer sealing effect, but the effect is relatively general. Because the sealing lid cannot be closed tightly or is easily loose, the sealing performance is often poor, causing the liquid to leak out. In the present disclosure, for the problem, the upper lid 12 and the reservoir 14 are snap-fitted such that the sealing lid 13 cannot move. Specifically, a first fastening structure 122 is provided inside the upper lid 12, a second fastening structure 141 is provided at the upper end of the reservoir 14, and the first fastening structure 122 can cooperate with the second fastening structure 141 to lock the sealing lid 13 in a space between the upper lid 12 and the reservoir 14. The first fastening structure 122 may be one or more polygonal mounting members, and includes an insertion end 1221, an upper snap-fit portion 1222, a limiting member 1223, and a lower snap-fit portion 1224. The insertion end 1221, the upper snap-fit portion 1222, the limiting member 1223, and the lower snap-fit portion 1224 are integrally formed. The insertion end 1221 is connected to the upper snap-fit portion 1222 and the lower snap-fit portion 1224, and is arranged at a first end of the polygonal mounting member. The limiting member 1223 is arranged at a second end of the polygonal mounting member. A cross-sectional length of the insertion end 1221 in an axial direction of the hummingbird feeder 1 is smaller than a distance from an upper end of the upper snap-fit portion 1222 to a lower end of the lower snap-fit portion 1224, and is smaller than a width of a mounting groove 1413 formed in the second fastening structure 141. The reservoir 14 includes an upper engagement portion 1411 and a lower engagement portion 1412, and a mounting groove 1413 is formed between the upper engagement portion 1411 and the lower engagement portion 1412. The distance from the upper end of the upper snap-fit portion 1222 to the lower end of the lower snap-fit portion 1224 is adapted to the width of the mounting groove 1413, and a spacing is reserved between the upper snap-fit portion 1222 and the lower snap-fit portion 1224, such that the first fastening structure 122 can produce a slight deformation when squeezed by the second fastening structure 141, thereby preventing an excessive pressure on the second fastening structure 141 from causing damage to the second fastening structure 141 or affecting the service life thereof. When the upper part of the hummingbird feeder 1 is mounted, the end of the sealing lid 13 with the sealing rings 10 is first inserted into the upper end of the reservoir 14, and then the upper lid 12 is sleeved in the sealing lid 13. The first fastening structure 122 of the upper lid 12 and the second fastening structure 141 of the reservoir are tightly matched, the insertion end 1221 is inserted into the mounting groove 1413, and the upper lid 12 is rotated, such that the upper engagement portion 1411 is in contact with the upper snap-fit portion 1222 via an inclined surface of the insertion end 1221 and clamps the upper lid 12 and the reservoir 14. When the upper lid 12 is rotated until the limiting member 1223 is in contact with the upper engagement portion 1411, the upper lid 12 cannot be rotated anymore and is well snap-fitted with the reservoir 14. After the snap-fitting, the lower end of the first ant-proof unit 121 is in contact with the upper end of the sealing lid 13, and a downward pressure of the upper lid 12 on the sealing lid 13 is not zero. The sealing lid 13 can be pressed tightly through the downward pressure of the upper lid 12 on the sealing lid 13, such that a limiting structure of the sealing lid 13 abuts against the reservoir 14, and the sealing rings 10 on the sealing lid 13 are in full contact with the reservoir 14, thereby increasing the sealing degree, improving the sealing performance, and preventing the stored liquid from leaking. Indication arrows are marked on the upper lid 12 and the reservoir 14, allowing users to align the arrows. When the arrows are aligned, a base insertion end 1221 of the first fastening structure 122 directly faces the mounting groove 1413, and the reservoir 14 or the upper lid 12 is rotated at this moment to complete mounting.

Please refer to FIG. 6 to FIG. 8, the reservoir 14 is opened at the upper end and hollowed inside, and is provided with a reservoir cavity 142 for accommodating a liquid. The reservoir cavity 142 is connected to the base 17 from top to bottom. A mounting space 146 for accommodating the camera unit 15 is formed in the middle of the reservoir 14. The camera unit 15 includes a camera device 151, an accommodating mechanism 152, a snap-fit mechanism 153, finger flanges 154, a rotating shaft 155, and a wire channel 156. The camera device 151 is mounted in the accommodating mechanism 152, and the accommodating mechanism 152 is movably connected to the snap-fit mechanism 153 by means of the rotating shaft 155. The snap-fit mechanism 153 is movably mounted in the mounting space 146.

The camera unit in the prior art is snap-fitted in the reservoir by means of a buckle at the top end, and when the camera unit needs to be removed, two hands are required for cooperation. One hand presses down the buckle, and the other hand pushes the camera unit from front to back, and thus the camera unit is removed. However, several defects are caused. Firstly, disassembling is inconvenient. Secondly, the lens is inevitably touched when the camera unit is pushed, such that the lens is polluted and needs to be cleaned. Additionally, a power supply interface of the camera device is usually provided at the rear end of the camera unit, increasing the probability that the lens is wetted by the rainwater and thus damaged. The snap-fit mechanism 153 in the present disclosure is provided with two finger flanges 154 and the wire channel 156. The two finger flanges 154 are respectively arranged on two sides of the snap-fit mechanism 153, and can cooperate with reservoir buckles 144 to fix the snap-fit mechanism 153. The wire channel 156 can accommodate at least fingers of one adult, and preferably, the longitudinal height of an opening of the wire channel 156 is at least 1.4 centimeters, and the transverse length is at least 1.6 centimeters. In this way, fingers of most persons can be accommodated, facilitating operations during disassembling and assembling of the camera unit 15. In addition, a power cord enters the mounting space 146 from the wire channel 156, reducing the probability of the power cord being wetted by the rainwater, and protecting the camera unit 15 to a certain extent. When the camera unit 15 is removed, a forefinger can extend into the wire channel 156, and a thumb and another finger respectively hold the finger flanges 154 at two ends. The three fingers together can easily and stably remove the camera unit 15. In this way, single-hand operation is facilitated, and three-finger cooperation also makes the removing process more stable, and pollution caused by a finger possibly touching the lens is also avoided. During mounting, it is only necessary to align the snap-fit mechanism 153 with the mounting space 146, push the snap-fit mechanism 153 therein, and snap-fit the two finger flanges 154 and the two reservoir buckles 144. In this way, the mounting is completed. To attach the power cord to the snap-fit mechanism 153 without affecting the extending and retracting operations of the fingers, a wire fixing device 157 for fixing the power cord can be provided on the snap-fit mechanism 153. The wire fixing device 157 can clamp the power cord without affecting the removing operation. The fingers are not obstructed or cushioned to cause discomfort when extending into the wire channel 156 for operation.

Please refer to FIG. 8 to FIG. 12, a reservoir sealing ring groove 145 is provided at the lower end of the reservoir 14. There is at least one, preferably two reservoir sealing ring grooves 145. The sealing rings 10 are correspondingly sleeved on the reservoir sealing ring grooves 145. A third fastening structure 143 is provided at the lower end of the reservoir 14, a fourth fastening structure 171 is provided on the base 17, and the third fastening structure 143 and the fourth fastening structure 171 can cooperate to complete bottom mounting and fastening.

The fourth fastening structure 171 may be one or more polygonal mounting members, and includes a base insertion end 1711, a base upper snap-fit portion 1712, and a base lower snap-fit portion 1714. The base insertion end 1711, the base upper snap-fit portion 1712, and the base lower snap-fit portion 1714 are integrally formed. The base insertion end 1711 is connected to the base upper snap-fit portion 1712 and the base lower snap-fit portion 1714, and is arranged at one end of the polygonal mounting member. A cross-sectional length of the base insertion end 1711 in the axial direction of the hummingbird feeder 1 is smaller than a distance from an upper end of the base upper snap-fit portion 1712 to a lower end of the base lower snap-fit portion 1714, and is smaller than a width of a base mounting groove 1433 formed in the third fastening structure 143. The reservoir 14 includes a base upper engagement portion 1431 and a base lower engagement portion 1432, and a base mounting groove 1433 is formed between the base upper engagement portion 1431 and the base lower engagement portion 1432. The distance from the upper end of the base upper snap-fit portion 1712 to the lower end of the base lower snap-fit portion 1714 is adapted to the width of the base mounting groove 1433, and a spacing is reserved between the base upper snap-fit portion 1712 and the base lower snap-fit portion 1714, such that the fourth fastening structure 171 can produce a slight deformation when squeezed by the third fastening structure 143, thereby preventing an excessive pressure on the third fastening structure 143 from causing damage to the third fastening structure 143 or affecting the service life thereof. When the lower part of the hummingbird feeder 1 is mounted, the reservoir 14 is inserted into the base 17, the third fastening structure 143 cooperates with the fourth fastening structure 171, the base insertion end 1711 is inserted into the base mounting groove 1433 from a first end of the base mounting groove 1433, and the reservoir 14 is rotated, such that the base upper engagement portion 1431 is in contact with the base upper snap-fit portion 1712 to clamp the reservoir 14 and the base 17. An inclined surface can be provided on the base lower engagement portion 1432, facilitating smooth engagement. When the reservoir 14 is rotated until the base insertion end 1711 is in contact with a second end of the mounting groove 1433, the reservoir 14 cannot be rotated anymore and is well snap-fitted with the base 17. When snap-fitting is completed, the reservoir 14 generates a gravity-independent pressure on the base 17. The pressure of the reservoir 14 on the base 17 can enable the sealing rings 10 sleeved on the reservoir 14 to be in full contact with the base 17, thereby increasing the sealing degree, improving the sealing performance, and preventing the stored liquid from leaking. Indication arrows are marked on the base cover plate 16 and the reservoir 14, allowing users to align the arrows. When the arrows are aligned, the base insertion end 1711 of the fourth fastening structure 171 directly faces the base mounting groove 1433, and the reservoir 14 or the base 17 is rotated at this moment to complete mounting.

The base 17 is provided with a base liquid outlet 174, a base sealing member 176, and a base reservoir 173. The base liquid outlet 174 communicates the base reservoir 173 and the reservoir cavity 142, and the liquid stored in the reservoir cavity 142 enters the base reservoir 173 through the base liquid outlet 174. The base sealing member 176 is made of a soft waterproof material, the shape thereof is adapted to that of the base reservoir 173, and the size thereof is slightly greater than that of the base reservoir 173, such that the base sealing member 176 is in interference fit with the base reservoir 173. During use, the base sealing member 176 is put in the base reservoir 173, and the stored liquid enters the base reservoir 173 from the base liquid outlet 174 to fill the base sealing member 176 and enable the base sealing member 176 to provide an outward pressure, such that an outer wall of the base sealing member 176 abuts against an inner base of the base reservoir 173 to achieve a better waterproof effect. The liquid can be prevented from flowing to the left, right, and rear space of the base 17.

A base cover plate 16 covers the base 17, and is provided with a feeding port 161, a perch 162, and a blossom-shaped feeder 163. The perch 162 includes a perch mounting hole 1621, a perching portion 1622, and a perch connecting portion 1623. The perching portion 1622 is connected to the perch mounting hole 1621 by means of the perch connecting portion 1623. A lower end of the blossom-shaped feeder 163 penetrates the perch mounting hole 1621 and is then inserted into the feeding port 161, and penetrates the base sealing member 176 to reach the base reservoir 173. A hummingbird can suck nectar in the base reservoir 173 by inserting its beak into the blossom-shaped feeder 163. A distance between the perching portion 1622 and the perch mounting hole 1621 of the perch 162 is 1-5 centimeters, and preferably 2-4 centimeters. In this way, a distance between the perching portion 1622 and the feeding port 161 is appropriate, such that the hummingbird can just suck the stored nectar when standing on the perching portion 1622. At this time, the camera device 151 can be employed to capture a static, clearer image of the hummingbird.

A base external groove 177 is provided at the lower end of the base 17 for externally connecting a fixing device. To facilitate adaptation, various different interfaces are provided in the base external groove, such as a cylindrical mounting interface and a plate-shaped screw fixing and mounting interface. In the present disclosure, the cylindrical mounting interface is employed for externally connecting a connecting member 18. The connecting member 18 may include a connecting member snap-fit mechanism 182 and a second ant-proof unit 181. The connecting member snap-fit mechanism 182 can be arranged at any one end or both ends of the connecting member 18 to achieve a fixing effect. The second ant-proof unit 181 is arranged in the middle of the connecting member 18, may be a ring-shaped water groove, and is filled with water or an insecticidal liquid during use to prevent insects such as ants from climbing onto the base 17 along with the connecting member 18.

The connecting member 18 has one end connected to the base 17 and the other end connected to a bracket 19. The bracket 19 includes a transverse bracket body 198 and a vertical bracket body 199. The transverse bracket body 198 and the vertical bracket body 199 can be movably connected or fixedly connected, and can also be integrally formed. During normal use, the transverse bracket body 198 is perpendicular to the vertical bracket body 199. The transverse bracket body 198 is provided with a bracket external groove 191, and the bracket external groove 191 can be connected to the base 17 by means of the connecting member 18. The bracket external groove 191 can be internally provided with a bracket snap-fit mechanism 192, and the bracket snap-fit mechanism 192 can be matched and snapped with the connecting member snap-fit mechanism 182 of the connecting member 18, such that the hummingbird feeder 1 is mounted more firmly. An universal mounting hole 193 can further be provided on the transverse bracket body 198 to conveniently adapt to other types of bird feeders.

In the prior art, when the camera device needs to be powered, a power cord is usually required. The power cord has one end connected to the camera device and the other end connected to a solar power supply device, a socket or the like. Ants or squirrels easily climb onto the feeding device along with the power cord. In the present disclosure, the transverse bracket body 198 is further provided with a third ant-proof unit 194, and the third ant-proof unit 194 is arranged around the bracket through hole 196 to store water or an insect repellent. The bracket through hole 196 communicates the upper and lower ends of the transverse bracket body 198. A protective plug 195 is mounted in the bracket through hole 196, and is a soft plug. The protective plug 195 is provided with an electric wire through hole 1951 for allowing the protective plug 195 to penetrate, and an electric wire can penetrate the protective plug 195 from one end to the other end. The protective plug 195 can achieve dual effects of preventing insects such as ants and squirrels. When the protective plug 195 mainly prevents the insects such as ants, the power cord is connected to a power supply and then penetrates the electric wire through hole 1951 from top to bottom, and then the other end is connected to the camera device 151. In this way, the insects such as ants can be blocked by the third ant-proof unit 194 when climbing onto the protective plug 195 along with the electric wire, and cannot reach the hummingbird feeder 1. When the protective plug 195 mainly prevents the squirrels, the power cord is connected to the power supply and then penetrates the electric wire through hole 1951 from bottom to top, and then the other end is connected to the camera device 151. In this way, the squirrels can be blocked by the bottom of the transverse bracket body 198 when climbing onto the protective plug 195 along with the electric wire, and cannot reach the hummingbird feeder 1.

The vertical bracket body 199 can provide a more stable fixing mode. When the vertical bracket body 199 is needed for mounting, a vertical mounting hole 197 is aligned with a prefixed auxiliary mounting member such as a nail to mount the bracket 19. This mounting mode can enable the entire vertical bracket body 199 to be buckled on an object waiting for mounting such as a tree and a wall, such that the whole hummingbird feeder 1 is more stable and not prone to shaking, resisting natural situations such as strong wind. Moreover, pictures taken by the camera device 151 can be clearer. A mounting interface is further provided at the lower end of the bracket 19 for mating with a support rod directly standing on the ground, providing more mounting modes.

Compared with the prior art, in the present disclosure, by means of the design of the upper lid 12, the sealing lid 13 and the reservoir 14, the pressure of the upper lid 12 on the sealing lid 13 enables the sealing lid 13 to press the reservoir 14 tightly, ensuring full contact between the sealing rings 10 and the reservoir 14, and effectively improving the sealing performance. The first fastening structure 122 and the second fastening structure 141 cooperate to snap-fit the upper lid 12 and the reservoir 14. The structural design of the first fastening structure 122 and the second fastening structure 141 achieves a smoother snap-fit process and more stable snap-fitting, prolongs the service life of the two, and makes the two not easily damaged. By means of the design of detachable connection between the base 17 and the reservoir 14, the pressure of the reservoir 14 on the base 17 is greater than the gravity of the reservoir 14, ensuring full contact between the sealing rings 10 and the base 17, and further improving the sealing performance.

The embodiments of the present disclosure have been described above with reference to the accompanying drawings, but the present disclosure is not limited to the foregoing specific implementations. The foregoing specific implementations are only illustrative and not restrictive. Under the inspiration of the present disclosure, a person of ordinary skill in the art can make many improvements without departing from the purpose of the present disclosure and the protection scope defined by the claims, and these improvements shall fall within the protection scope of the present disclosure.

What is claimed is:

1. A hummingbird feeder, comprising: an upper lid, a reservoir, a camera unit, and a base, wherein the hummingbird feeder further comprises a sealing lid, sealing rings are sleeved on the sealing lid, the sealing lid is detachably connected to the reservoir, outer walls of the sealing rings are connected to an inner wall of the reservoir, the upper lid is sleeved in the sealing lid and detachably connected to the reservoir, and after the upper lid is connected to the reservoir, a pressure of the upper lid on the sealing lid is not zero.

2. The hummingbird feeder according to claim 1, wherein sealing ring grooves are provided on the sealing lid, the sealing rings are sleeved on the sealing ring grooves, and there are three sealing rings.

3. The hummingbird feeder according to claim 1, wherein the upper lid comprises a first fastening structure, the reservoir comprises a second fastening structure, and the first fastening structure and the second fastening structure cooperate with each other to snap-fit the upper lid and the reservoir.

4. The hummingbird feeder according to claim 3, wherein the first fastening structure comprises one or more polygonal mounting members, the second fastening structure comprises an upper engagement portion and a lower engagement portion, a mounting groove is formed between the upper engagement portion and the lower engagement portion, and the first fastening structure is inserted in the mounting groove for mounting.

5. The hummingbird feeder according to claim 4, wherein the first fastening structure comprises an insertion end, an upper snap-fit portion, and a lower snap-fit portion; the insertion end, the upper snap-fit portion, and the lower snap-fit portion are integrally formed, a cross-sectional length of the insertion end in an axial direction of the hummingbird feeder is smaller than a width of the mounting groove, and a distance from an upper end of the upper snap-fit portion to a lower end of the lower snap-fit portion is adapted to a width of the mounting groove.

6. The hummingbird feeder according to claim 5, wherein a spacing is reserved between the upper snap-fit portion and the lower snap-fit portion.

7. The hummingbird feeder according to claim 1, wherein the camera unit comprises a camera device, an accommodating mechanism, a snap-fit mechanism, finger flanges, a rotating shaft, and a wire channel; the camera device is mounted in the accommodating mechanism, the accommodating mechanism is movably connected to the snap-fit mechanism by means of the rotating shaft, the snap-fit mechanism is detachably mounted on the reservoir, there are two finger flanges, and the two finger flanges are respectively arranged on two sides of the snap-fit mechanism and form a triangle together with a connecting line of the wire channel.

8. The hummingbird feeder according to claim 1, wherein the hummingbird feeder further comprises a feeding port, a blossom-shaped feeder, and a perch; the perch comprises a perch mounting hole; a lower end of the blossom-shaped feeder penetrates the perch mounting hole and then is inserted into the feeding port; the perch further comprises a perching portion and a perch connecting portion; and the perching portion is connected to the perch mounting hole by means of the perch connecting portion.

9. The hummingbird feeder according to claim 1, wherein the base is detachably connected to the reservoir, the sealing rings are sleeved on the reservoir, the outer walls of the sealing rings are connected to an inner wall of the base, and after the reservoir is connected to the base, the reservoir generates a gravity-independent pressure on the base.

10. The hummingbird feeder according to claim 1, wherein the hummingbird feeder further comprises a bracket, the bracket comprises a transverse bracket body and a vertical bracket body, the transverse bracket body is perpendicular to the vertical bracket body, a third ant-proof unit and a bracket through hole are provided on the transverse bracket body, the third ant-proof unit is arranged around the bracket through hole, the bracket through hole communicates an upper end and a lower end of the transverse bracket body, a protective plug is mounted in the bracket through hole, and an electric wire through hole for the protective plug to penetrate is provided on the protective plug.

* * * * *